Dec. 15, 1964     F. B. RUSSELL     3,161,788
WALL STRUCTURE FOR AN MHD GENERATOR
Filed Dec. 2, 1960     3 Sheets-Sheet 1

FREDERICK B. RUSSELL
*INVENTOR.*

BY *Alden D. Redfield*
*Warren Kice*
ATTORNEYS

FREDERICK B. RUSSELL
INVENTOR.

BY
ATTORNEYS

Dec. 15, 1964  F. B. RUSSELL  3,161,788
WALL STRUCTURE FOR AN MHD GENERATOR
Filed Dec. 2, 1960  3 Sheets-Sheet 3

FREDERICK B. RUSSELL
*INVENTOR.*

BY Alden D. Redfield
Warren Kune
ATTORNEYS

3,161,788
WALL STRUCTURE FOR AN MHD GENERATOR
Frederick B. Russell, Reading, Mass., assignor to Avco Corporation, Cincinnati, Ohio, a corporation of Delaware
Filed Dec. 2, 1960, Ser. No. 73,374
11 Claims. (Cl. 310—11)

The present invention relates to a wall structure having anisotropic properties and more particularly to a wall structure having markedly different electrical and thermal conductivities in directions parallel to and perpendicular to its surface. More particularly, the invention relates to a wall structure having excellent thermal conductivity in a direction perpendicular to its surface but substantially no electrical conductivity in the plane of the wall.

Although not limited to such applications, the novel structure finds particular use in magnetohydrodynamic (abbreviated MHD) devices, such as generators for producing electrical power. For convenience, the invention will be described in an MHD environment but it will be understood by those skilled in the art that the environment in no way constitutes a limitation of the invention.

Magnetohydrodynamics is growing rapidly in importance, particularly in the electric power generation. Unlike more conventional generating equipment that involves many moving parts and appears to have reached the zenith of its development, MHD generators have no moving parts and may be expected to far excel conventional equipment in efficiency of operation. In general terms, an MHD generator comprises a duct through which high temperature, electrically conductive gas flows at high velocity. A magnetic field is provided through the duct perpendicular to the direction of gas flow. Movement of the gas relative to the magnetic field induces an electromotive force at right angles to both the direction of gas flow and the field. This electromotive force can be used to establish flow of current between opposed electrodes in communication with the gas stream and through a load circuit connected to the electrodes provided that the gas is a conductor of electricity.

Since a potential difference exists between the electrodes within the generator, and a potential gradient exists within the gas stream itself, it will be immediately apparent that the generator walls must not conduct electrictly lest they short-circuit these potentials.

I is also to be noted that the gas temperatures may be so high that known materials cannot maintain their structural integrity at such temperature levels. In much the same way that the theoretical efficiency of a turbine is a function of the temperature difference experienced by the working fluid in passing through the turbine, the efficiency of an MHD generator is likewise dependent upon the temperature drop of the conductive gases passing through it. Since no moving parts are involved, higher inlet temperatures can be used than in conventional equipment. Not only does the higher inlet temperature improve operating efficiency but it also aids in increasing the electrical conductivity of the gas stream. It necessarily follows that in practical, continuous duty generators the walls must be cooled to lower their temperature to safe operating limits.

The present invention satisfies both of the foregoing electrical and thermal conductivity requirements.

First, it should be noted that few materials are known that have, at high temperature, high thermal conductivity and low electrical conductivity. Such materials are not at present considered practical for use in MHD generators. If the walls of a generator were simply constructed of metal, they could be readily cooled, as by water cooling, but they would provide a highly conductive path through which the generated potential would readily be short-circuited. On the other hand, if the entire walls were made of a refractory substance, they would act as electrical insulators but have insufficient thermal conductivity to make effective cooling possible. In contrast, the novel wall described herein is of such a nature that heat may readily be conducted through the wall while low electrical conductivity is maintained in the plane of the wall.

Briefly, the preferred embodiment of the present invention comprises individual metal rods that are secured to parallel, spaced electrically nonconductive plates. The rods project into the interior of the generator duct and are spaced from one another to accommodate an electrically nonconductive refractory that is disposed between the rods and flush with their projecting ends to form a smooth interior for the generator duct. This construction, which for convenience, may be termed a "metal mosaic" provides a high rate of heat transfer through the rods and electrical isolation, as well as thermal isolation, of the rods in all directions in the plane of the wall parallel to its surface. The heat transferred by the rods may be dissipated in a cooling medium circulated in the space between the parallel plates.

Mention has already been made of the potential gradients existing across the generator duct between opposed generator electrodes. Depending upon the design of the generator and its mode of operation, other potentials, resulting from the "Hall field" parallel to the length of the duct, may exist in the gas stream. The preferred novel wall construction is also effective in preventing short-circuiting of such potentials, as will be described in greater detail.

In view of the foregoing general comments, it will be apparent that a broad object of the invention is to provide a novel wall having anisotropic properties, and more specifically, having different thermal and electrical conductivities in directions perpendicular and parallel to its surface.

Another object of the invention is to provide an improved wall structure that is well adapted for use in MHD equipment.

Still another object of the invention is the provision of a wall in which individual cooling elements extend between and project beyond spaced parallel supporting plates between which coolant may be circulated to absorb heat from the cooling elements.

Other objects of the invention are as follows:

(a) The provision of an anisotropic wall having strength sufficient to withstand both the gas pressures and coolant pressures present in an MHD generator.

(b) The provision of a wall for an MHD device having good thermal conductivity normal to its plane, low electrical conductivity in its plane, and a smooth interior surface for minimizing friction and heat losses in gases passing over it.

(c) A wall structure having simple coolant flow paths for effectively cooling the wall with a minimum of losses.

The novel features that are considered characteristic of the invention are set forth in the appended claims; the invention itself, however, both as to its organization and practical application, together with additional objects and advantages thereof, will best be understood from the following description of specific embodiments when read in conjunction with the accompanying drawings, in which:

Figure 1:
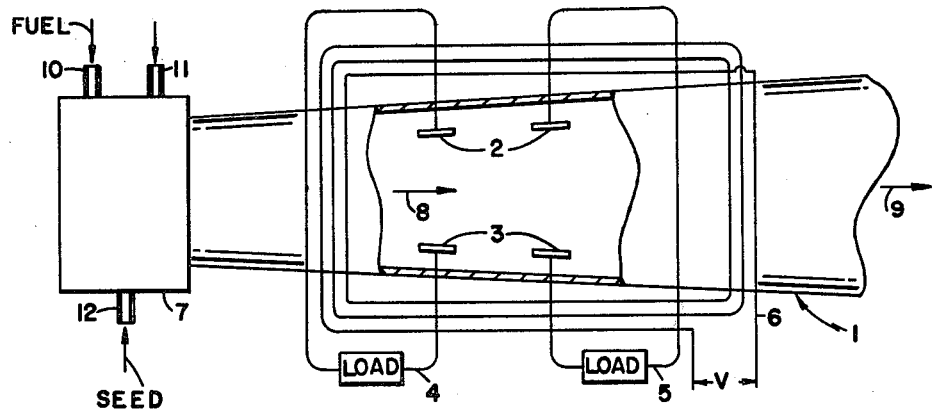
FIGURE 1 is a schematic illustration of an MHD generator in which the present invention may be used to advantage.

Directing attention to FIGURE 1, an MHD generator installation is shown comprising a generator duct, generally designated 1, having associated with it a plurality of opposed electrodes 2 and 3 that are electrically connected in external load circuits 4 and 5. Surrounding the exterior of the duct is an electrically conductive coil 6 that may be energized from a voltage source V provided by any conventional means, such as an auxiliary generator (not shown), or the MHD generator itself, to produce a unidirectional magnetic field through the duct, perpendicular to the plane of the paper. A combustion chamber 7 delivers to the duct a high temperature, high velocity gas stream, indicated by the arrow 8, the gas leaving the duct at 9. The combustion chamber, which comprises no part of the present invention, may be supplied with any fuel, such as fuel oil, and with a combustion supporting medium, such as air, pure oxygen, or an oxygen-nitrogen mixture having an oxygen concentration in excess of that of air. The means for introducing the fuel and combustion suporting medium are indicated at 10 and 11. To enhance the conductivity of the gas stream there may be inroduced to the combustion chamber at 12 an easily ionizable "seed," such as sodium, potassium, or cesium, or their salts, usually in an amount less than 1% of the weight of fuel. The gas, upon entering the generator duct may have a temperature in excess of 5000° F.

Figure 2:
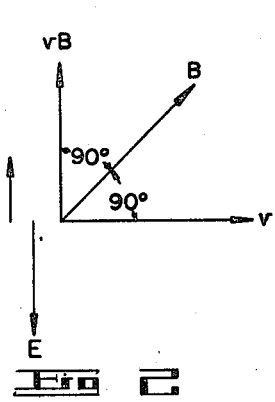
FIGURE 2 is a vectorial representation of current, magnetic field and gas velocity conditions within an MHD generator in which the Hall field is negligible.

The vector diagram of FIGURE 2 indicates the gas travelling at velocity $v$ through the transverse magnetic field B. The interaction of the conductive gas with the magnetic field induces a potential gradient within the gas stream that is the cross product of $v \times B$ in a direction perpendicular to both the direction of gas movement and the magnetic field. Because of loading and also voltage drops at the electrodes, the electric field E between the electrodes is somewhat smaller than $v \times B$ and may be approximately 0.5–0.8 of the $v \times B$ value. Shown parallel to the E vector in FIGURE 2 is the $j$ vector indicating current flow through the conductive gas between the electrodes.

The $v \times B$ potential gradient exists within the gas stream and will be short-circuited through the side walls of the generator duct unless they are made electrically nonconductive.

Figure 3:
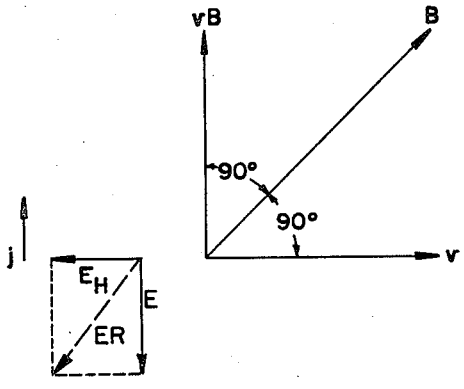
FIGURE 3 is a vectorial representation of current, magnetic field and velocity conditions within an MHD generator in which the Hall field is significant.

Shown in FIGURE 3 are the current, magnetic field and potential conditions within a gas generator in which the Hall field is significant.

Origin of the Hall field may now be considered. It should be recognized that the gas moving through the generator duct is a slightly ionized plasma having a substantially equal number of positive ions and electrons. Since the electrons are very much lighter than the ions, they have far greater mobility in an electron field and carry the great majority of the current. The current flow between opposed electrodes is thus due almost entirely to electron flow. The drift velocity of the electrons, $v_e$, is given by the following equation:

$$v_e = \frac{j}{n_e e} \text{ meters/sec.} \quad (1)$$

where:

$j$ = current density (amps/meter²)
$n_e$ = electron density (meter⁻³)
$e$ = electron charge, coulombs It should be noted, however, that the drift velocity of the electrons is perpendicular to the magnetic field B. This causes an electric field (known as the "Hall field" $E_H$) to be induced along the length of the duct. This field may be calculated from the following equation:

$$E_H = v_e B = \frac{jB}{n_e e} = \omega \tau v B (1 - \alpha) \quad (2)$$

$\omega$ = electron cyclothron velocity (sec.⁻¹)
$\tau$ = mean electron collision time (sec.)

$$\alpha = \frac{E}{vB} \text{ (nondimensional)}$$

$E$ = electric field between electrodes (volts/meter)

Directing attention now to FIGURE 3, the gas velocity is again designated $v$ and the magnetic field is designated B. As described with reference to FIGURE 2, the $v \times B$ potential gradient is induced as a result of the gas movement through the field. This results in an electric field E between the opposed electrodes. However, the Hall field $E_H$ is directed along the axis of the gas stream in a direction opposite to its movement. The resulting electric field $E_R$ is thus directed at an angle to the direction of movement of the gas stream.

For gases of practical interest for use in MHD generators, the Hall field can be quite large, equal sometimes to two to three times the size of $v \times B$. If an electrically conductive path exists along which the Hall field can establish current flow, a reduction of electrical conductivity in the direction of the opposed electrodes will result, resulting in an impairment of over-all generator performance. By means of the present invention, a novel construction for the generator wall is provided that will prevent flow of current in the plane of the wall under the influence of the resultant electric field. As a result, the current flow can be confined to the gas path between opposed electrodes. Such current flow is indicated by the vector $j$ in FIGURE 3.

In partial summary, it will be noted from FIGURES 2 and 3, that the present invention is designed to prevent short-circuiting of the resultant of the electric field E and the Hall field $E_H$ by way of the walls of the generator duct. At the same time, the wall has sufficient thermal conductivity that its temperature may be reduced to safe operating limits.

Figure 4:
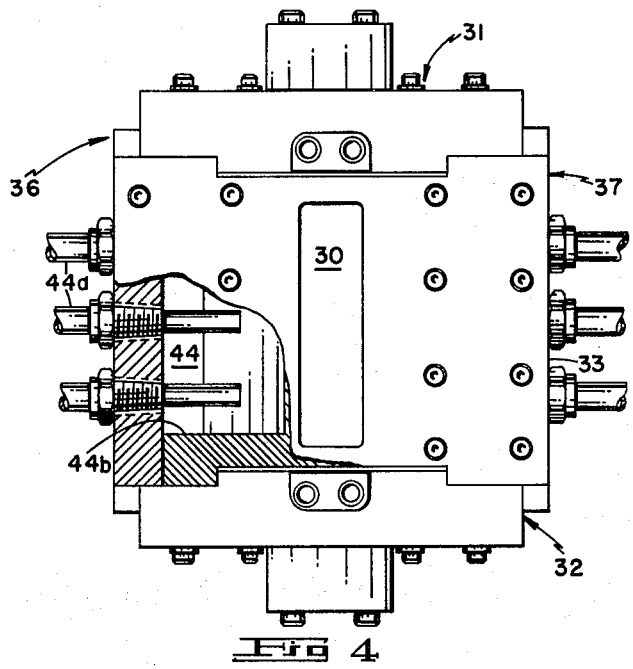
FIGURE 4 is an end view of a duct for a generator in which the Hall field is significant.
Figure 5:
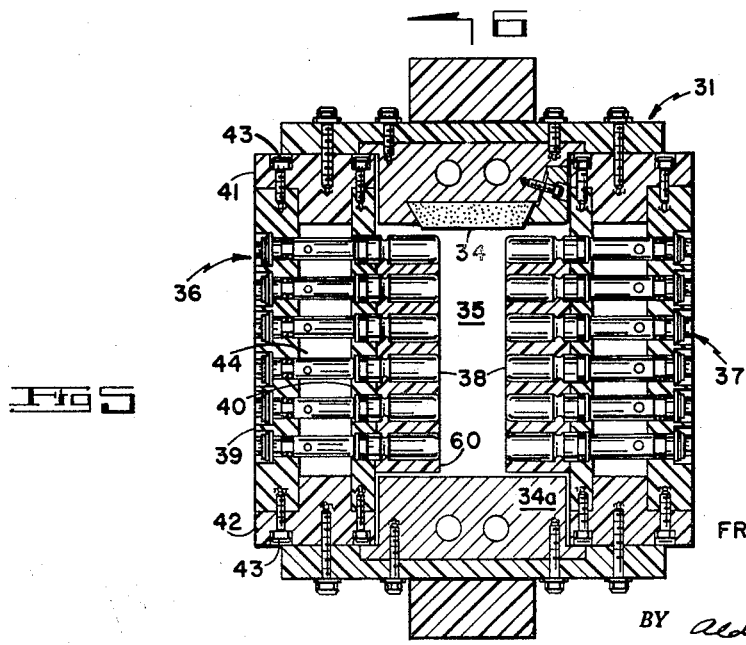
FIGURE 5 is a cross sectional view of the duct shown in FIGURE 4.
Figure 6:
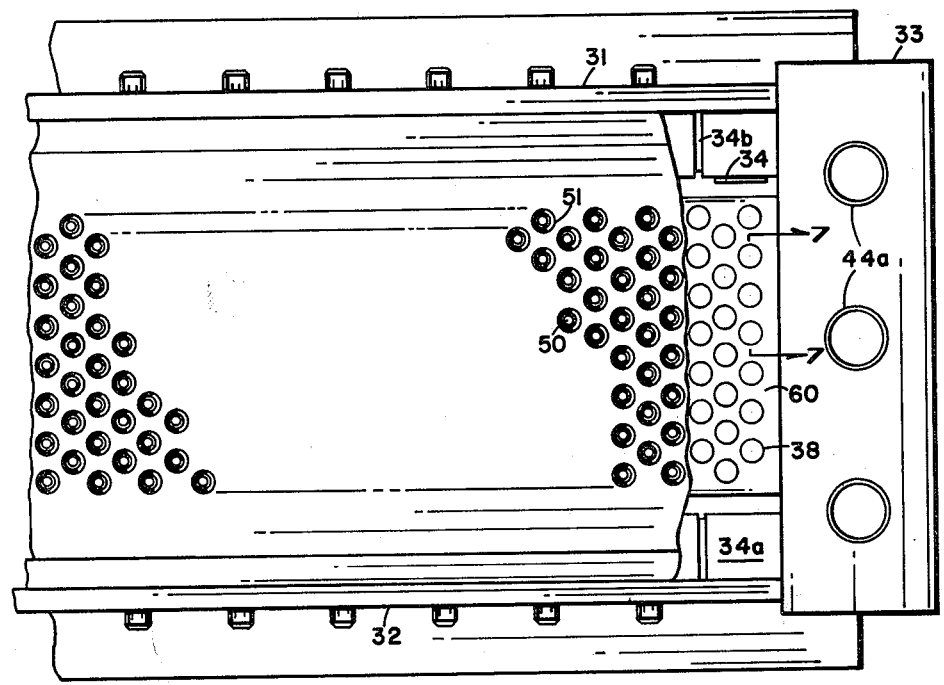
FIGURE 6 is a longitudinal sectional view of a duct taken on plane 6—6 of FIGURE 5.

FIGURES 4–6 show a generator duct for use in a generator having a significant Hall field and/or a non-uniform induced field. Under such circumstances, the side walls of the generator duct must be electrically nonconducting in all directions in the plane of the walls.

FIGURE 4 shows an end view of the assembled duct including an inlet port 30 through which the high temperature gas is introduced to the duct. Electrode assemblies, generally designated 31 and 32 extend the length of the duct and are attached at their ends to end plates, one of which is shown at 33. The side walls, designated generally 36 and 37, are sealed and secured to the end plates. Each wall supports a plurality of metallic rods 38 that extend into the duct, their inner ends cooperating in defining the flow channel for the gas.

From FIGURES 5 and 6, it is apparent that the electrode assembly 31 supports a plurality of carbon cathodes, one of which is shown at 34, that are in communication with the gas flowing through the interior of the duct 35. Electrode assembly 32 supports a plurality of copper anodes 34a, also in communication with the gas. The cathodes are electrically insulated from each other by plastic separators 34b. The anodes are similarly insulated. By insulating the cathodes and anodes in this manner, electrical short circuits through the electrode assemblies are prevented. The advantage of separating the electrodes in segments as well as various load circuits that may be used with such electrodes are more fully set forth and claimed in U.S. patent application Serial No. 860,973, filed by Arthur R. Kantrowitz et al. on December 21, 1959, entitled "Means for and Method of Preventing Hall Currents in Electrical Equipment."

Attention may now be directed to the details of construction of side wall 36 which is substantially the same as that of side wall 37. First it will be noted that two parallel spaced plates of insulating material are provided at 39 and 40. These are secured to a top spacer bar 41 and a bottom spacer bar 42, the bars and plates being held in assembled relationship by cap screws 43.

Plates 39 and 40 define between them a coolant channel 44. The rods 38 extend from the exterior of the wall assembly through the channel to the interior of the duct. Shown in FIGURE 4 are coolant inlet pipes 44a through which coolant is supplied to header 44b. From the header the coolant flows to channel 44. Attention is called to the fact that a straight-through coolant path is provided and that all of the rods in one wall of the generator may be cooled from a common channel.

The coolant may be water. After cooling the walls of the duct, the water may be supplied to a steam-electric generating system (not shown) that may be used to supplement the electrical output of the MHD generator.

Figures 7, 8:
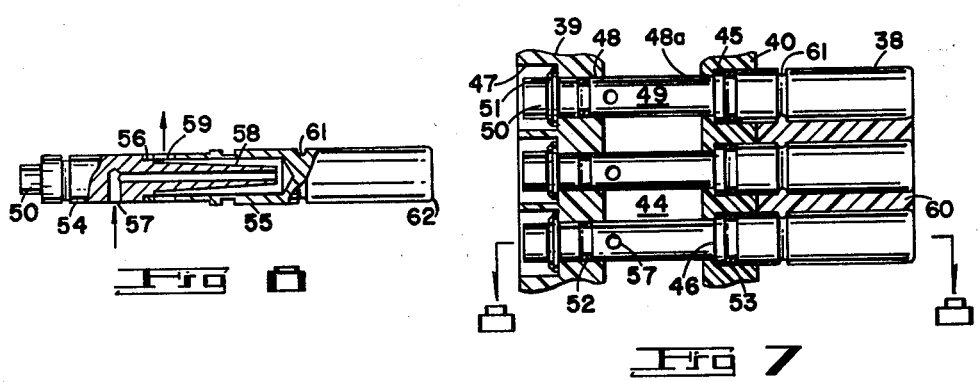
FIGURE 7 is an enlarged view of a plurality of rods in assembled relationship within the generator duct illustrated in FIGURES 4–6; the view being taken on plane 7—7 of FIGURE 6.
FIGURE 8 is an enlarged fragmentary sectional view of one of the rods as viewed on plane 8—8 of FIGURE 7.

The assembly of the rods to the plates 39 and 40 can be better understood from a study of FIGURE 7 which shows three rods in assembled position. It will be noted that plate 40 defines a counterbored hole 45 with which a shoulder 46 of the rod 38 cooperates. Plate 39 also defines a counterbored hole 47 that is co-axial with hole 45 and with holes 48 and 48a through which the shank 49 of the rod extends. The shank terminates in a section 50 of reduced diameter on which may be force-fitted a washer 51 which engages the bottom of counterbored hole 47. In effect, the shank 49 of the rod serves as a through-bolt for preventing plates 39 and 40 from being forced apart under the pressure of coolant flowing between them. The shoulder 46 of the rod and washer 51 in turn prevent rotation and axial movement of the rods relative to their supporting plates. O ring seals may be provided at 52 and 53 to prevent leakage of coolant from the coolant space between the plates.

In FIGURE 8, the internal construction of one of the rods is shown. It comprises a section 54 brazed within surrounding section 55, the joint therebetween being shown at 56. Section 54 includes an inlet port 57 that communicates with a nozzle 58 extending within the interior of section 55. Coolant may enter at 57 and flow by way of nozzle 58 into the hollow interior of section 55. The coolant then counterflows along the exterior of the nozzle to an outlet port 59 formed in section 55 of the rod.

Returning to FIGURE 7, it will be noted that inlet ports 57 of all of the rods face in a common direction in the coolant channel 44. In use, the cooling water flows towards the rods in a direction perpendicular to the plane of the paper. Since the shanks of the rods constitute an obstruction to the coolant, a pressure drop occurs across them providing a pressure head for forcing the coolant through the interior of the rods.

The need for internal cooling of the rods depends upon the operating characteristics of the generator, and more particularly, the temperature, pressure, velocity and type of gas that is employed. For some generators, internal cooling of the rods may be unnecessary and the heat transfer from the exteriors of the shanks to the coolant may be satisfactory. In any event, sufficient heat must be extracted from the rods to protect the support plates 39 and 40 and the O rings 52 and 53 from overheating.

Attention should now be directed to FIGURE 6 which shows a part of the generator duct in longitudinal section and the interior surface of wall 36 in elevation. It will be noted that the rods 38 are closely packed but not touching. Desirably, for heat transfer purposes, the rods should comprise as large a portion of the wall as possible. In order to prevent radiant heat transfer to plate 40, the spaces between the rods may be filled in with a refractory material 60. Grooves 61 are provided in the rods for accommodating the refractory material, which is installed in a plastic state. In this way, the refractory, after it has hardened, is mechanically keyed to the rods and a strong wall structure is assured. The refractory may be trowled into the spaces between the rods until it is flush with their projecting ends. A smooth interior surface is thus provided for accommodating the gas flow with a minimum of friction losses and heat transfer. By maintaining a small space between the rods, elecrical conduction therebetween is prevented and cooling of the refractory is assured even at high heat transfer rates.

It has been found convenient to make the rods of soft copper because of its high thermal conductivity. On the other hand, the material does not constitute a limitation of the invention and other highly conductive metals, such as stainless steel, may be used. The supporting plates 39 and 40 may be made from any durable material having good strength at the temperature and pressures to be encountered. A plastic that has been found satisfactory is sold under the trademark Pyrotex. It is a low flow, low resin, high pressure, laminated plastic identified by Style No. 41–RPD and manufactured by Raybestos-Manhattan, Inc., Manheim, Pa. As in the case of the other components, the refractory material is not critical since heat transferred to the refractory is easily transferred to the metal rods through relatively thin refractory sections. One material that is deemed satisfactory is sold under the trademark Blazecrete 3X, manufactured by Johns-Manville, New York, New York.

Although the length of the rods extending from plate 40 into the interior of the generator duct is not critical, the diameter of the rods is of importance. It will be recalled from the discussion of FIGURES 2 and 3, that an electrical field, $E_R$, exists parallel to the interior surface of the wall. If the voltage developed across the diameter of a given rod exceeds the voltage necessary for initiating an arc discharge from the gas stream to the rod, current, instead of flowing in the gas stream, will flow via an arc discharge into and through the rod. To prevent this from happening, it is necessary to proportion the rods so that the product of the local electric field and the characteristic rod diameter is less than the voltage $V_0$ for initiating an arc discharge (arc burning) in the gas. This voltage falls in the range of 10–100 volts for most gas conditions found in a practical MHD generator. For purposes of illustration a typical value of 30 volts may be assumed for $V_0$.

To illustrate by way of example, but not limitation, it may be assumed that the magnetic field B through the duct, is equal to 3 webers/meter² and that the gas velocity $v$ is 1000 meters/sec. The $v \times B$ product is then equal to 3000 volts/meter. Assuming for simplicity that there is no Hall field, the electric field E may be assumed to be approximately equal to 3000 volts/meter. The following calculation may then be made to determine the characteristic rod diameter $d$:

$$v \times B \times d < V_0$$
$$d < \frac{V_0}{v \times B} < \frac{30}{3000}$$
$$d < .01 \text{ meter} \quad (3)$$

If a Hall field is present, the value of $E_R$ may be two to three times greater than $v \times B$ and the rod diameter must be correspondingly reduced in size.

Since arcs tend to concentrate at sharp corners of conducting members, the ends 62 of the rods are rounded (see FIGURE 8).

With regard to the spacing between adjacent rods, it is merely necessary that it be such that no current will flow through the space between adjacent rods. In some generators where operating temperatures are not high, it is possible to eliminate the refractory material and merely depend, for insulating purposes, upon the insulating qualities of the stagnant, relatively cool, air mass that exists in the space between the rods.

For convenience of manufacture, the rods may have a circular cross section. It should be clearly understood, however, that such a configuration is not necessary to the success of the invention. Indeed the cross sectional shape of the rods could be square, hexagonal, or any other shape and size that meet the foregoing criterion with respect to arc discharge to the rods.

Figure 9:
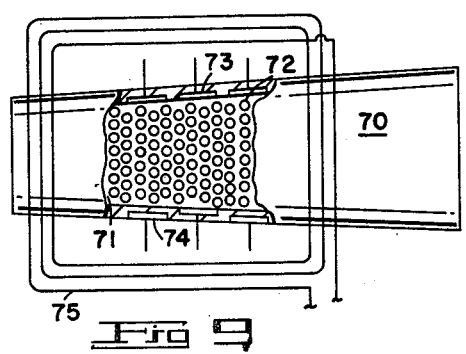
FIGURE 9 is a schematic of a divergent generator duct employing the principles of the invention.

FIGURE 9 is a diagrammatic illustration of a generator duct employing the principles of the present invention. Attention is called to the tapered shape of the duct, the cross sectional area of which increases in the ratio of about 1:4 from the inlet to the outlet. The cross section of the duct at any point may be circular, or rectangular, or any other shape that is found convenient for the design of the particular generator involved. As illustrated, the cross section of the duct is rectangular and has an aspect ratio (ratio of the width to height) of about 1:1.

The generator ducts illustrated in FIGURES 4–6 are particularly useful for research investigations of parameters having bearing on MHD power generation. It should be understood, however, that the proportions of their gas flow channels would not be optimum for a continuous duty MHD generator, which would be proportioned more as illustrated in FIGURE 9.

In the FIGURE 9 duct, the side wall 70 has been broken away to illustrate the interior surface of the remote side wall 71. The projecting ends of a plurality of metal rods are indicated by the circles at 12. The rods, which may be similar to those shown in FIGURES 4–8, fill the area of the wall exposed between opposed electrodes 73 and 74. As in the generators described previously, the electrodes may be segmented, i.e., made in individual sections to prevent short-circuiting of the Hall potential, and a coil 75 may be provided adjacent the duct to establish a magnetic field through it.

The various features and advantages of the construction disclosed are thought to be clear from the foregoing description. Others, not specifically enumerated, will undoubtedly occur to those versed in the art, as likewise will many advantages and modifications of the preferred embodiment of the invention illustrated, all of which may be achieved without departing from the spirit and scope of the invention, as defined by the following claim.

I claim:

1. In combination in a wall structure forming part of a duct for receiving a high temperature electrically conductive fluid in a magnetohydrodynamic device wherein an electric field is parallel to a major surface of said wall structure, a pair of spaced parallel plates of electrical insulation, spacer bars for holding said plates in spaced relationship and defining with said plates a coolant channel therebetween, said plates including rows of co-axial counterbored holes, and metal rods extending through the counterbored holes in electrically mutually insulated relation, each rod including a shoulder cooperating with the counterbore of one associated hole and fastening means cooperating with the counterbore of the other associated hole for securing said rod and said plates relative to each other and preventing movement of said plates away from each other, said rods projecting beyond at least one of said plates, the portion of said rods projecting beyond said one of said plates being solid and having substantially flat and continuous end surfaces all lying in substantially a single plane and in communication with said fluid.

2. Apparatus as defined in claim 1 in which each of said rods defines interior cooling passages in communication with the coolant channel between said plates.

3. Apparatus as defined in claim 2 and, in addition, a refractory material disposed between said rods where they project beyond said plates.

4. A wall structure forming part of a duct for receiving a high temperature electrically conductive fluid in a magnetohydrodynamic device wherein an electric field is parallel to a major surface of said wall structure comprising a pair of parallel spaced plates of electrical insulation, means for holding said plates in spaced relationship and cooperating with said plates in defining a cooling channel, said plates defining a plurality of co-axial holes, a plurality of metal rods disposed each in a separate one of the co-axial holes and extending through the space between said plates in electrically mutually insulated relation, said rods extending through and projecting from one of said plates, the maximum dimension $d$ in meters of each said rod in a plane parallel to said electric field being less than about the voltage necessary to initiate an arc discharge in the fluid divided by the voltage of said electric field in volts per meter, means for securing said rods to said plates to prevent relative displacement thereof, and a refractory material disposed between the portions of said rods projecting from said one of said plates.

5. A wall structure for an MHD generator comprising a pair of spaced plates of electrical insulation defining a coolant channel therebetween, a plurality of spaced metal rods extending in electrically mutually insulated relation between said plates and to a plane spaced from said plates, and refractory material disposed between said rods and filling the space between the plane and said plate nearest thereto.

6. Apparatus as defined in claim 5 in which each of said rods has internal coolant passages in communication with the coolant channel.

7. A wall structure comprising a pair of spaced plates of electrical insulation defining a coolant channel therebetween, a plurality of spaced thermally conductive rod shaped members supported by said plates and extending in electrically mutually insulated relation through the coolant channel and beyond one of said plates, and refractory material substantially filling the spaces between said members adjacent said one of said plates and exterior to the cooling channel.

8. A wall structure comprising a pair of spaced plates defining a coolant channel therebetween, a plurality of thermally conductive rod shaped members extending in electrically mutually insulated relation through the cooling channel to a point exterior of the space between said plates, said members being arranged in staggered rows and each including internal cooling passages communicating with an inlet port facing in on direction in the coolant channel and a discharge port facing in an opposite direction in the coolant channel.

9. Apparatus as defined in claim 8 and, in addition, a refractory material disposed between said members where they extend beyond said plates, said refractory material and said members defining a continuous surface.

10. Apparatus as defined in claim 9 in which each of said members defines a groove for keying said refractory material in place between said members.

11. Apparatus as defined in claim 10 in which the ends of said members remote from said plates are rounded.

References Cited in the file of this patent

UNITED STATES PATENTS

| | | |
|---|---|---|
| 2,874,317 | Couse | Feb. 17, 1959 |
| 2,994,203 | Lackey et al. | Aug. 1, 1961 |

FOREIGN PATENTS

| | | |
|---|---|---|
| 284,774 | Great Britain | Feb. 3, 1928 |
| 359,774 | Great Britain | Oct. 29, 1931 |
| 640,871 | Germany | Jan. 14, 1937 |

UNITED STATES PATENT OFFICE
CERTIFICATE OF CORRECTION

Patent No. 3,161,788                      December 15, 1964

Frederick B. Russell

It is hereby certified that error appears in the above numbered patent requiring correction and that the said Letters Patent should read as corrected below.

Column 1, lines 46 and 47, for "electrictly" read -- electricity --; line 48, for "I" read -- It --; column 3, line 58, for "inroduced" read -- introduced --; column 8, line 73, for "on" read -- one --.

Signed and sealed this 18th day of May 1965.

(SEAL)
Attest:

ERNEST W. SWIDER                      EDWARD J. BRENNER
Attesting Officer                       Commissioner of Patents